(12) United States Patent
Langley

(10) Patent No.: US 10,326,155 B2
(45) Date of Patent: Jun. 18, 2019

(54) METHOD OF ELECTROLYTICALLY ASSISTED CARBOCHLORINATION

(71) Applicant: Justin Langley, Moorhead, MN (US)

(72) Inventor: Justin Langley, Moorhead, MN (US)

( * ) Notice: Subject to any disclaimer, the term of this patent is extended or adjusted under 35 U.S.C. 154(b) by 112 days.

(21) Appl. No.: 14/852,028

(22) Filed: Sep. 11, 2015

(65) Prior Publication Data

US 2016/0068926 A1     Mar. 10, 2016

Related U.S. Application Data

(62) Division of application No. 14/240,569, filed as application No. PCT/US2013/053980 on Aug. 7, 2013, now Pat. No. 9,163,297.

(51) Int. Cl.
| | | |
|---|---|---|
| *H01M 8/0612* | (2016.01) | |
| *C22B 1/08* | (2006.01) | |

(Continued)

(52) U.S. Cl.
CPC .......... *H01M 8/0618* (2013.01); *B01D 47/00* (2013.01); *B01D 53/326* (2013.01); *C01B 3/00* (2013.01);

(Continued)

(58) Field of Classification Search
CPC .... C22B 1/08; C22B 5/00; C22B 5/10; C22B 5/12; C22B 7/001; C22B 7/009; C22B 59/00; B01D 53/326; H01M 8/0618
See application file for complete search history.

(56) References Cited

U.S. PATENT DOCUMENTS

| | | | | |
|---|---|---|---|---|
| 1,426,507 A | * | 8/1922 | Rodrian | C22B 4/00 |
| | | | | 205/366 |
| 2,234,967 A | * | 3/1941 | Gilbert | C25B 1/36 |
| | | | | 204/212 |

(Continued)

FOREIGN PATENT DOCUMENTS

| | | | |
|---|---|---|---|
| CA | 2593472 A1 | * | 1/2009 |
| EP | 0013586 B1 | | 10/1982 |
| WO | 2010/104732 A2 | | 9/2010 |

OTHER PUBLICATIONS

Machine Translation of CA 2593472, published Jan. 2009.*

(Continued)

*Primary Examiner* — Tima M McGuthry-Banks
(74) *Attorney, Agent, or Firm* — Danielson Legal LLC

(57) ABSTRACT

Method of combining industrial processes having inherent carbon capture and conversion capabilities offering maximum flexibility, efficiency, and economics while enabling environmentally and sustainably sound practices. Maximum chemical energy is retained throughout feedstock processing. A hybrid thermochemical cycle couples staged reforming with hydrogen production and chlorination. Hydrogen generated is used to upgrade feedstocks including bitumen, shale, coal, and biomass. Residues of upgrading are chlorinated, metals of interest are removed, and the remainder is reacted with ammonia solution and carbon dioxide to form carbonate minerals. The combination provides emissions free production of synthetic crude oil and derivatives, as well as various metals and fertilizers. Sand and carbonate minerals are potentially the only waste streams. Through this novel processing, major carbon dioxide reduction is afforded by minimizing direct oxidation. Supplemental heat to run the reactions is obtained through external means such as concentrated solar, geothermal, or nuclear.

10 Claims, 1 Drawing Sheet

(51) Int. Cl.
  *B01D 53/32* (2006.01)
  *C22B 59/00* (2006.01)
  *H01M 8/0662* (2016.01)
  *C01B 3/00* (2006.01)
  *C01B 3/02* (2006.01)
  *C01B 3/34* (2006.01)
  *C10G 1/00* (2006.01)
  *C10J 3/84* (2006.01)
  *C10J 3/86* (2006.01)
  *C10L 3/08* (2006.01)
  *H01M 8/14* (2006.01)
  *H01M 8/18* (2006.01)
  *H01M 8/20* (2006.01)
  *B01D 47/00* (2006.01)

(52) U.S. Cl.
  CPC .................. *C01B 3/02* (2013.01); *C01B 3/34* (2013.01); *C01B 3/348* (2013.01); *C10G 1/002* (2013.01); *C10J 3/84* (2013.01); *C10J 3/86* (2013.01); *C10L 3/08* (2013.01); *C22B 1/08* (2013.01); *C22B 59/00* (2013.01); *H01M 8/0675* (2013.01); *H01M 8/14* (2013.01); *H01M 8/188* (2013.01); *H01M 8/20* (2013.01); *C01B 2203/02* (2013.01); *C01B 2203/0233* (2013.01); *C01B 2203/06* (2013.01); *C01B 2203/0833* (2013.01); *C01B 2203/1235* (2013.01); *C01B 2203/84* (2013.01); *C10J 2200/12* (2013.01); *C10J 2300/16* (2013.01); *C10J 2300/1643* (2013.01); *C10J 2300/1646* (2013.01); *Y02E 20/18* (2013.01); *Y02E 60/324* (2013.01); *Y02W 30/54* (2015.05)

(56) References Cited

U.S. PATENT DOCUMENTS

| | | | |
|---|---|---|---|
| 2,642,381 A | 6/1953 | Dickinson | |
| 3,586,613 A * | 6/1971 | Stewart | C22B 4/005 204/164 |
| 4,045,461 A | 8/1977 | Kiovsky et al. | |
| 4,243,639 A | 1/1981 | Haas et al. | |
| 4,664,849 A | 5/1987 | Farrington et al. | |
| 4,786,319 A | 11/1988 | Zeiringer | |
| 5,039,336 A | 8/1991 | Feuling | |
| 5,569,440 A | 10/1996 | Sommers | |
| 6,558,454 B1 | 5/2003 | Chang et al. | |
| 7,674,443 B1 | 3/2010 | Davis | |
| 8,470,271 B2 * | 6/2013 | Seetharaman | C01G 3/05 423/138 |
| 2007/0224109 A1 | 9/2007 | Chaifetz et al. | |
| 2008/0256952 A1 | 10/2008 | Litwin et al. | |
| 2010/0113624 A1 | 5/2010 | Routier | |
| 2011/0262323 A1 | 10/2011 | Rappas et al. | |
| 2012/0031232 A1 | 2/2012 | Huang | |
| 2012/0073198 A1 | 3/2012 | Goel et al. | |
| 2013/0005838 A1 | 1/2013 | Eilos et al. | |
| 2013/0020538 A1 | 1/2013 | Bingham | |
| 2013/0039824 A1 | 2/2013 | Abu-Sharkh | |

OTHER PUBLICATIONS

Bayley, Justine et al. "Roman and Medieval Litharge Cakes: Structure and Composition." 34th International Symposium on Archaeometry. Institucion Fernando el Catolico. pp. 1-4 and 145-153. (Year: 2004).*

"Commercial and Industrial Practices for Activated Carbon Management" from Disposal of Activated Carbon from Chemical Agent Disposal Facilities. National Research Council of the National Academies, p. 46. 2009.

Baliban et al., Optimization Framework for the Simultaneous Process Synthesis, Heat and Power Integration of a Thermochemical Hybrid Biomass, Coal, and Natural Gas Facility, Computers & Chemical engineering, Sep. 2011, pp. 1647-1690, vol. 34, Issue 9, Elsevier.

Cai et al., Development of Multifunctional Energy Sysetms, Energy, Nov. 2010, pp. 4375-4382, vol. 35, Issue 11, Elsevier.

International Search Report for International Application No. PCT/US2013/053980, dated Feb. 7, 2014, 8 pages, U.S. International Search Authority, Alexandria, Virginia.

Martynov et al., Water and Hydrogen in Heavy Liquid Metal Coolant Technology, Progress in Nuclear Technology (2005), pp. 604-615, vol. 47, Issues 1-4, Elsevier, Great Britain.

* cited by examiner

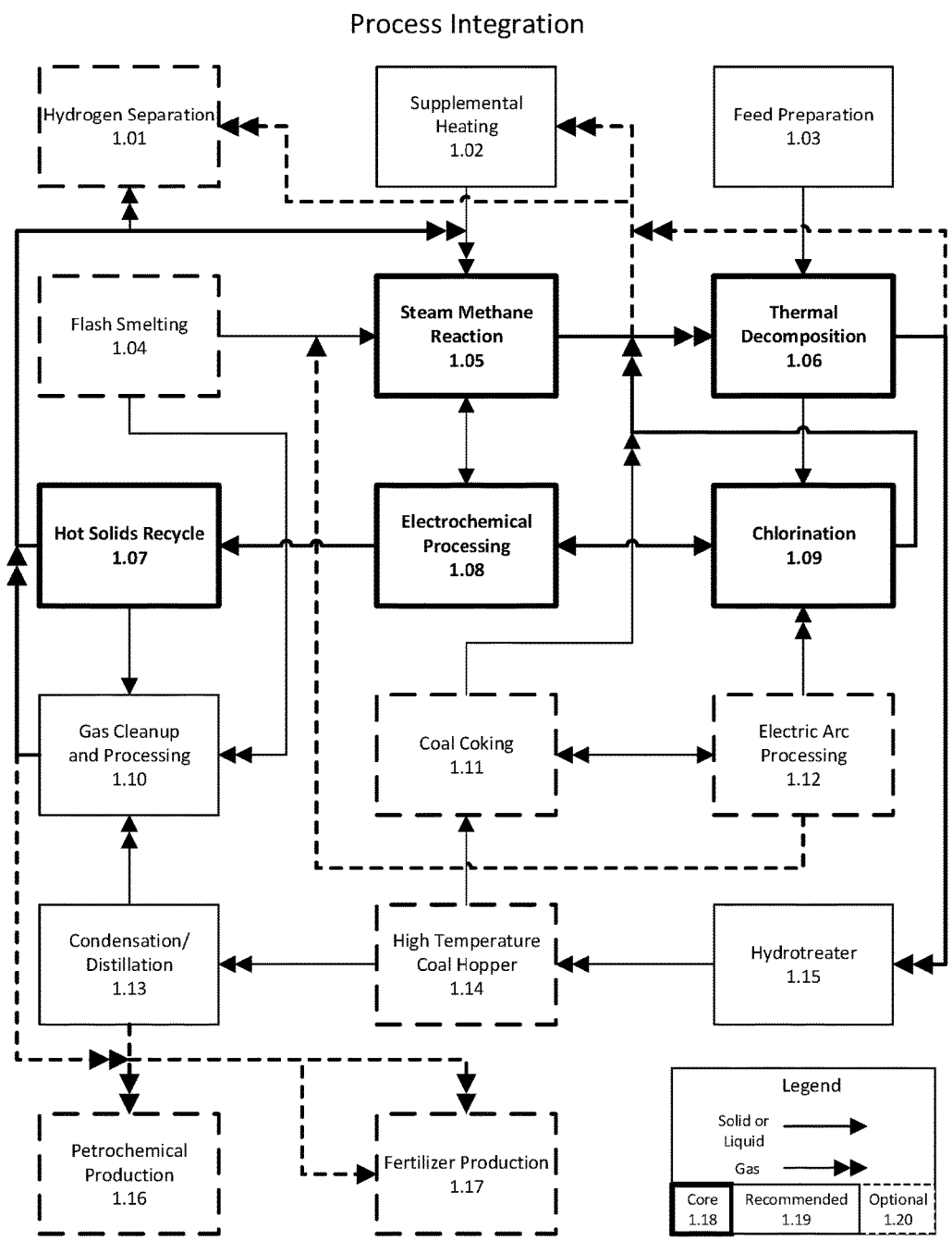

METHOD OF ELECTROLYTICALLY ASSISTED CARBOCHLORINATION

RELATED U.S. APPLICATION DATA

This application is a divisional of U.S. application Ser. No. 14/240,569, filed on Feb. 24, 2014, now U.S. Pat. No. 9,163,297, which is a national stage entry of international (PCT) Patent Appl. No. PCT/US/053980, filed on Apr. 7, 2013, which claims priority to the provisional U.S. application Ser. No. 61/680,393, filed on Aug. 7, 2012 and U.S. application Ser. No. 61/786,477, filed on Mar. 15, 2013, the entire disclosure of each of which is incorporated by reference as if set forth in their entirety herein.

TECHNICAL FIELD

The present invention relates generally to a system and method for improved material utilization in industrial processing. More specifically, the present invention addresses existing challenges with carbon and waste stream management of major processes of the petrochemical and metallurgy industries. More specifically still, the present invention utilizes a reconfigurable set of processes hot-coupled to each other enabling high-efficiency carbon capture and conversion as well as comprehensive waste stream management capabilities ideal for new plant design or retrofit.

BACKGROUND ART

Rising demand for fossil fuels, exasperated by rapidly developing nations, is driving the need for more efficient utilization of limited natural resources in conjunction with the development of alternative energy sources. Many modern advances in long utilized petrochemical practices such as gasification and hydrotreatment are enabling the cost effective utilization of so called unconventional fuels. Hybrid designs such as those discussed in papers "Development of Multifunctional Energy Systems" (Cai et al., Energy, 2010) and "Optimization Framework for the Simultaneous Process Synthesis, Heat and Power Integration of a Thermochemical Hybrid Biomass, Coal, and Natural Gas Facility" (Baliban et al., Computers & Chemical Engineering, 2011) enable the conversion of non-conventional fuels such as coal and natural gas as well as biomass and waste to be converted to direct replacements or additives for petrochemicals conventionally derived from oil. Furthermore, they are capable of utilizing carbon dioxide as a carbon source for conversion to synthetic fuels, oils, and other carbon materials.

these practices do have substantial costs involved however. Capitol costs of equipment as well as further energy costs are incurred depending on the chosen technology and level of carbon dioxide management sought. The reliance on air separation techniques common in high efficiency and especially carbon sequestration applications is one substantial cost. Further notable costs of such systems are hydrogen production methods that typically rely on direct oxidation of fuel inputs which in turn puts a greater load on carbon capture systems. An alternative method of hydrogen production via electrolysis is emissions free but even with onsite electricity production (which typically is not emissions free or highly efficient) represents a steep energy penalty. Even state of the art staged reforming processes coupled to numerous complementary subsystems rely to a large extent on legacy practices of energy production through direct oxidation and may or may not manage the resulting carbon dioxide produced. (US 2012/0073198 A1, U.S. Pat. No. 7,674,443) What is needed is a superstructure that takes advantage of the level of maturity of such legacy processes while integrating advances in alternative energy sources to efficiently deliver process heat. The present invention accomplishes this through the novel integration of hydrogen production with the indirect oxidation by carbochlorination of pyrolysis residues. Through this arrangement, heat is conserved and directed at hydrogen production and carbon dioxide formation is kept to a minimum.

Martynov et al. has shown in "Water and Hydrogen in Heavy Liquid Metal Coolant Technology" (Progress in Nuclear Technology, 2005) that molten lead-bismuth eutectic is an ideal catalyst for steam methane reactions. Combining this advantageous method of hydrogen production with heat amplification techniques allows for a range of viable alternative energy inputs such as direct or indirect heating provided by an advanced high temperature modular nuclear reactor.

Through this unique arrangement of processes, a large number of metallurgical subsystems may be integrated with a variety of synergistic benefits. Those of ordinary skill in the art should recognize the integration of a flash smelter provides for both the management of smelter off gases and an inherent drossing mechanism within the molten metal steam methane reactor. Similarly, steel production through recycling and direct reduction can be incorporated with highly beneficial off gas processing simultaneously complementing the carbochlorination process. A variety of processing methods are available for the extraction of valuable base metals from the feedstock through gaseous and electrochemical methods. In addition to the precious metals inherently captured by the molten metal steam methane reforming, rare earth elements (as well as the various radioactive species typically associated with them) are captured and concentrated by carbochlorination techniques that can be removed through methods already known in the art. (U.S. Pat. Nos. 5,039,336, 5,569,440) Also disclosed is a method of oxidizing the carbon component of carbochlorination residue using metal oxides from integrated processes as well as a novel electrochemical cationic exchange for extraction of residual components utilizing a solid electrolyte. (U.S. Pat. No. 4,664,849) Those of ordinary skill in the art will undoubtedly recognize other varying benefits of the process integration enabled by the present invention. Finally, by exploiting a staged reforming operation utilizing hydrogen produced in the steam methane reactor, oxidation of feedstock is minimized and hydrogenation is maximized. Feedstock impurities are internally managed and a plurality of options for their removal is available. One of the more unique features enabled is the production of carbonate minerals through a modified Solvay process utilizing the metal chlorides produced via carbochlorination. (EP 0013586131, US 2013/0039824 A1) This along with internal reprocessing of carbon dioxide relieves or eliminates the need for dedicated carbon capture subsystems and their attributed energy losses.

DISCLOSURE OF INVENTION

The present invention addresses the issue of carbon dioxide management in a staged reforming operation through tightly integrating methods of petrochemical processing, metallurgy, and ammonia-soda processing. Heat is generated by methods external to the invention and used to raise feedstock temperature to a predetermined level. Heat amplification as well as emissions management is inherently embodied within the invention by multiple direct contact heat exchanges between integrated processes. Thermal energy accumulated in the high-temperature subsystems is dissipated through endothermic steam methane reactions producing bulk hydrogen for consumption by coupled processes. Within these high temperature subsystems, heat from the carbochlorination of pyrolysis residues is generated and supplemented through the hot-coupling of further integrated processes. Carbon dioxide generated in carbochlorination is stripped of metal chlorides and combined with produced hydrogen to form a synthesis gas. This hot synthesis gas is employed in the pyrolysis of the feedstock and the combined gases are sent to a hydrotreatment vessel for upgrading and removal of impurities such as sulfur, halogens, nitrogen, and heavy metals. Gaseous impurities such as hydrogen chloride and hydrogen sulfide are removed from the gas stream following condensation of the higher molecular weight hydrocarbons and the remaining gases are further processed or recycled through the system. Base metals can be extracted as gaseous or liquid chlorides, separated and processed to oxides or another separable form, or removed through electro-deposition. Noble metals are removed with lead, copper, and related metals as dross from the steam methane reactor. Rare earth and radioactive elements present are concentrated by the carbochlorination and removed through cationic exchange, leaching, electrochemical, or other means. The remaining metal chlorides consisting substantially of alkali/alkaline chlorides as well as metal oxides consisting substantially of silica with varying amounts mixed oxide minerals transfer their useful heat to the input streams and the chlorides may be utilized in a modified Solvay process producing ammonium chloride and carbonate minerals. Carbon dioxide not mineralized is further processed through a reverse water gas shift reactor or other dedicated processing equipment as part of the gas cleanup and processing or recycled through the system. Carbon management is thus handled through minimization of direct oxidation, mineralization, and synthesis gas reprocessing.

BRIEF DESCRIPTION OF DRAWINGS

Further features, advantages and characteristics of the present invention will become apparent to a person of ordinary skill in the art from the following detailed description of best modes of carrying out the present invention, made with reference to the included drawing, in which the reference numbers used for selected subsystems are listed in order of appearance rather than by importance or stepwise fashion, and in which:

FIG. 1 illustrates the process integration of a number of embodiments of the present invention. Subsystems in bold are considered to be integral to the operation. Solid lighter outlined subsystems are believed to be ideal to the operation, however alternatives are known to exist and there may be advantageous arrangements not accounted for in the illustration. Dashed subsystems are considered to be advantageous embodiments but their exclusion is not considered detrimental in any way. Double arrowed lines represent gas streams and single arrows represent solids or (usually high temperature) liquids.

BEST MODES FOR CARRYING OUT THE INVENTION

With reference to FIG. 1, multiple configurations of the present invention can be arranged through the inclusion, exclusion, or modification of various subsystems. To those of ordinary skill in the art it should become apparent that only a subset of applicable subsystems has been included in the drawing and this should in no way limit the present invention to such subset. In accordance with a best mode of carrying out the present invention the drawing illustrates the integration of staged reforming with residue chlorination featuring inherent carbon oxide, heat, and waste management.

In accordance with best modes, all examples are implied to have attached to them an advanced high temperature nuclear reactor as a zero emissions heat source. Furthermore, all supplementary heating, cooling, and electricity required by the combination of integrated processes in the examples is assumed to be provided by said reactor and related apparatus. For the purpose of this disclosure, supplementary should be defined as any energy requirements not met by thermochemical changes within the proposed set of integrated subsystems. Further, in the examples it should be assumed that an outlet temperature of roughly 700 degrees centigrade is provided by the Supplemental Heating (1.02) and the heating costs of said arrangement are on par with coal. All of the Core components: Steam Methane Reaction (1.05), Thermal Decomposition (1.06), Hot Solids Recycle (1.07), Electrochemical Processing (1.08), and Chlorination (1.09) plus all of the Recommended components: Supplemental Heating (1.02), Feed Preparation (1.03), Gas Cleanup and Processing (1.10), Condensation/ Distillation (1.13), and Hydrotreatment (1.15) are assumed to be included in the examples.

For the purpose of further reference within the examples a brief explanation of the subsystems shown in FIG. 1 is as follows:

1.01 Hydrogen Separation is to include any number of known technologies for the production or separation of purified hydrogen for use or sale. The bulk hydrogen production will be assumed to proceed via the Steam Methane Reaction (1.05) subsystem and the current subsystem is to supplement the bulk hydrogen production through methods including purification by molecular sieves, pressure swing absorption, proton conducting ceramics, but is also meant to include production techniques such as electrolysis.

1.02 Supplemental Heating is to include heat generated or used outside of and supplemental to other integrated subsystems. This may include a conventional boiler, gas or combined cycle turbine, or fuel cell; in which case it converts produced gas into electricity for sale or use. This subsystem is also meant to include any means of external energy input such as direct or indirect heating or heat recovery as well as electricity from solar, wind, or hydro for example. In most cases it is assumed that this supplemental energy is input substantially through steam to the Steam Methane Reaction (1.05) or through electricity for the Electrochemical Processing (1.08). Combined cycle configurations such as waste heat capture through desalination would also be included in this subsystem.

1.03 Feed Preparation is to include any crushing, grinding, blending, pulping, pelletizing, de-watering, pre-heating or related pre-processing applied to the feedstock which may be located on premise or at a remote facility. The overall pre-processing required is assumed to be largely dependent on locally available resources and in turn impact the applicability of the integration of various subsystems within a given locale. Essentially any materials may be prepared and decomposed by the overall processing with the only limitations to feedstock being whether it economically meets the design requirements through local availability constraints.

1.04 Flash Smelting is to include the necessary apparatus for the smelting of sulfide ores or more precisely ore concentrates. This is to include both primary and secondary smelting. In conjunction with conventional flash smelting this is to include means of oxidizing molten lead from the Steam Methane Reaction (1.05) and its utilization within this subsystem or other applicable subsystems. Preferably this means of oxidation provides a heated stream of nitrogen enriched air to be utilized in other subsystems. All outputs from this subsystem are preferably sent advantageously to other subsystems; lead bullion to the Steam Methane Reaction (1.05), slag to Chlorination (1.09), and sulfur dioxide to a Claus plant in Gas Cleanup and Processing (1.10) for example. A further noteworthy use of this subsystem may be expanded to calcination without exceeding its disclosed scope.

1.05 Steam Methane Reaction is to include any configuration of a reactor or reactors operating by reacting steam with molten lead or lead alloy at moderate to high temperature. Further included are means or methods of removing oxygen from the molten lead or lead alloy such as reaction with methane or other gases, use of a solid oxide conducting ceramic, or direct carbon reduction for example. Also included are the use of further oxidation agents such as carbon dioxide or metal oxides and the overall management of oxygen levels. Implied in this oxygen management is the accumulation or concentration of metal oxide impurities along with noble metals providing dross of significant economic potential.

1.06 Thermal Decomposition is to include heating of the feedstock to separate volatile materials as well as any process or apparatus used for or in conjunction to this purpose. In accordance with best modes of operation it is assumed that this subsystem is coupled to the Steam Methane Reaction (1.05) and Chlorination (1.09) subsystems which provide hot gases utilized by this subsystem to volatilize the feedstock, in turn cooling and reacting the gases before processing by Hydrotreatment (1.15). Feedstock may be fed directly to this subsystem or as intermediate streams from other subsystems. Regardless of the specific arrangement of this subsystem, it serves to convert fed materials to gases and char residue consisting of inert mineral, spent catalyst, and fixed carbon which are then processed by Chlorination (1.09). This is in contrast to conventional staged reforming involving direct oxidation and/or heat reclamation.

1.07 Hot Solids Recycle is to include processes reclaiming heat from the remaining solid oxides exiting Chlorination (1.09). In accordance with best modes it is assumed that this useful heat is to be transferred to water/steam and that recovery of salts from brine is to be included as well. These salts are then utilized in Gas Cleanup and Processing (1.10) through the formation of carbonate minerals. Oxides having their useful heat recycled may be discharged as tailings or used within construction or other industries.

1.08 Electrochemical Processing is to include a wide range of processing methods available to advantageously drive redox reactions through electrochemical means. This includes molten salt or gaseous electrolysis through solid or liquid electrolytes/electrodes as well as plasma processing. This subsystem is assumed to be operating between or in tandem with the Steam Methane Reaction (1.05) and Chlorination (1.09) subsystems and further includes the circulation of molten lead between the two. In accordance with best modes it is envisioned such lead circulation may be carried out by magneto-hydro-dynamic pumping, conventional pumping, or gravity and displacement. Within this subsystem, substantially all metals that are not to be discharged to Hot Solids Recycle (1.07) are extracted from the Chlorination (1.09) output. There may be methods employed for this purpose that are equivalent, better than, or supplementary to electrochemical processes that for the purposes of this disclosure fall within this subsystem. Although conventionally direct current is utilized in similar apparatus, the present invention is not preferential to alternating or direct current within this subsystem.

Slag removed from the primary reaction vessel would consist mainly of silicon, calcium, aluminum, and iron oxides as well as various trace metals. The extraction of these elements in a reduced and/or purified form would be advantageous as a value-added product over the traditional option of using it as industrial filler, as energy has already been added to heat it to such a high temperature. Carbochlorination and oxide electrolysis are two methods among a range of possible metallurgical configurations that are presently adopted for such recovery. The present invention proposes a hybrid method of plumbo-electro-chlorination. In said process, lead bullion is chlorinated and mixed with the slag within an alkali-halogen melt which dissolves the oxides. The chloride would then react with highly electroactive oxides (alkali and alkaline earths) undergoing spontaneous metathesis reactions. Reactivity is further enhanced through electrolysis within the same cell consisting of active/regenerative electrodes composed of molten lead compounds. Lead bullion/lead chloride would act as a cathode, the alkali-halogen melt with dissolved oxides would be the electrolyte and lead/lead oxide would be used as the anode material completing the molten electrolysis cell. Lead is cycled from the main reaction vessel, drossed, chlorinated then oxidized and finally returned to the main reactor as an oxygen carrier to heat the main vessel. Within this electrolysis setup, there exists the potential to selectivity and cost effectively remove nearly any of the remaining metals through cathodic deposition, vapor transport, and hydro-leaching from the salt.

1.09 Chlorination is to include any method or apparatus utilized for the purpose of indirect oxidation of the carbon constituent of the char produced by Thermal Decomposition (1.06) subsystems and chlorination of intermixed metals. This is in contrast to oxidation methods typical of staged reforming or gasification in that metal chlorides are produced. In accordance with a best mode of carrying out the present invention embodiments such as a rotating kiln, fluidized bed, manifold fluidized bed, or partially fluidized bed seem most suitable. A plurality of chlorides can be allowed to volatilize from the chlorinator then separated from the carbon oxides produced or alternatively kept within a chloride melt and electrodeposited. The present invention is not preferential to either processing technique. Volatilized chlorides not captured for removal will migrate to the Thermal Decomposition (1.06) subsystem, reacting with present oxides, and drop out or are filtered from the gas stream. Hot carbon monoxide from the Electric Arc Processing (1.12) or a similar process is also utilized as an oxygen sink. Further, carbon dioxide or various metal oxides and chlorides may be introduced to moderate reactivity and temperature. Dependent on the embodiment, thermal management is a major consideration for optimal operation as the heat generated drives the Thermal Decomposition (1.06) and Steam Methane Reaction (1.05) subsystems through transfer of materials.

Electrochemical Processing (1.09) is one method available to maintain high operating temperatures with various complementary benefits.

1.10 Gas Cleanup and Processing is to include primarily the management of sulfur and carbon dioxide which may include conventional management processes such as acid gas stripping, chlorine knockout, dust collection, ammonia collection, cryogenic separation, sulfuric acid or Claus processes. Depending on the embodiment, sulfur dioxide from the Flash Smelting (1.04) and hydrogen sulfide from the Condensation\Distillation (1.13) may be reacted directly in a Claus process replacing or relieving the need for air or oxygen feed. Capture of either gas with calcium carbonate is also commonly practiced. In accordance with best modes this subsystem further utilizes alkali and alkaline chlorides from the Hot Solids Recycle (1.07) subsystem in a modified Solvay process for the capture of carbon dioxide as carbonate minerals. Within this disclosure the use of the term alkali chloride(s) or alkaline chloride(s) are considered to be synonymous and include Group 1 and Group 2 elements due to similar processing reactions. Due to this distinction, various methods of chlor-alkali, lime, and fertilizer production may directly relate to this subsystem, although Fertilizer Production (1.17) has its own subsystem maximal separation both in classification and physical proximity of these subsystems is considered in the best mode of carrying out the present invention. Cleanup is performed on the uncondensed gases from the Condensation/Distillation (1.12) subsystem and involves removing hydrogen chloride, hydrogen sulfide, and ammonia produced in the Hydrotreatment (1.15) from the gas. Carbon dioxide that is not mineralized may be recycled by conventional synthesis gas processing techniques operating within this subsystem or reprocessed within the superstructure of the invention by passing it through. Furthermore this subsystem may be expanded to include the entire range of applicable petrochemical processes in which case the synthesis gas processing involved has significant complementary overlap with Petrochemical Production (1.16) subsystems.

1.11 Coal Coking is to include means of contacting preheated coal from the High Temperature Coal Hopper (1.14) with hot gases from the Electric Arc Processing (1.12) volatilizing and cracking entrained hydrocarbons and producing a coke product. Volatilized gases are then sent to the Thermal Decomposition (1.06) subsystem while coke and/or reduced metals present may be introduced to the Electric Arc Processing (1.12) or other applicable processes.

1.12 Electric Arc Processing is to include any configuration of electric arc furnace apparatus that may further benefit the integrated processes through: recycling of steels, production of steel from direct reduced or electro won iron, acting as a high temperature carbon monoxide source, an appropriate carbon sink for coke, a high temperature apparatus for heating and reacting metals, slags, or gases from other processes, formation of slag appropriate as a heat carrier to other processes, reduction of silica or alumina to their metallic forms, production of metal chlorides for the chlorinator, or for leaching noble metals from molten metal to a lead alloy suitable for introduction to the Steam Methane Reaction (1.05). In accordance with best modes, a major advantage to incorporating this subsystem would be utilizing electricity produced through Supplemental Heating (1.02) to provide high temperature gases to the Chlorination (1.09) and Coal Coking (1.11) subsystems.

1.13 Condensation/Distillation is to include means for separating a fraction or fractions of the gas stream from the Hydrotreatment (1.15) producing a crude oil or varying fractions thereof for the Petrochemical Production (1.16) subsystem. Uncondensed gases flow through to Gas Cleanup and Processing (1.10).

1.14 High Temperature Coal Hopper is to include means for preheating coal to be sent to the Coal Coking (1.11) subsystem by contact with hot gases from Hydrotreatment (1.15). Further, this direct contact may be used to partially volatilize the coal producing a near-coke. Methods of condensing a portion of the high molecular weight fraction of the gas stream and passing it to the Coal Coking (1.11) for cracking may also be utilized. Utilizing sulfur sorbent mixed with the coal as well as circulation or fluidization between this subsystem and the Hydrotreatment (1.15) and Coal Coking (1.11) subsystems are considered best practices. Management of vaporous mercury present in the gas feed could also be carried out in this manner.

1.15 Hydrotreatment is to include the processing of volatilized gases from the Thermal Decomposition (1.06) with large amounts of hydrogen generated by the Steam Methane Reaction (1.05) through a high pressure moderate temperature reactor. It may further include the utilization of conventional catalysts as well as alkali\alkaline catalysts which react to form carbonates and drive the water gas shift reaction. The overall object of the subsystem is to saturate the hydrocarbon gases, simultaneously reacting to form hydrogen sulfide, hydrogen chloride, and ammonia which can then be removed in the Gas Cleanup and Processing (1.10) subsystem. Destruction of a plurality of organic pollutants is further achieved within this subsystem.

1.16 Petrochemical Production is to include the processing and handling of bulk or fractionated hydrocarbons from the Condensation/Distillation (1.13) as well as light gases from Gas Cleanup and Processing (1.10) and is meant to cover the entire range of petrochemical processing. Also included are blending, refining, and preparation for transport such as by pipeline or rail.

1.17 Fertilizer Production is to include the integration of ammonia production through reaction of hydrogen supplied by Hydrogen Separation (1.01) and nitrogen supplied by other subsystems such as the Flash Smelting (1.04) after passing through Gas Cleanup and Processing (1.10). Further it is to include the production of ammonium or alkali/alkaline salts such as carbonates, phosphates, nitrates, sulfates, sulfides, or urea.

In one embodiment of the present invention, tar sand production may be of primary importance. Utilizing the Core and Recommended subsystems of FIG. 1, along with Petrochemical Processing (1.16) a light sweet synthetic crude oil for pipeline transportation is produced with zero harmful emissions, wastewater, or hazardous tailings and complete carbon conversion conserves more chemical energy of the feedstock than conventional processing. Sand and carbonates may be utilized along with steam produced for further in-situ tar sand recovery. Furthermore, biomass and poly-metallic shale can be fed into the system taking advantage of both the carbon conversion efficiency and metal separation.

Another embodiment of the present invention is beneficial where mixed sulfide ores may be within an economically reasonable distance of mineable shale and coal formations. Utilizing the Core and Recommended subsystems of FIG. 1, along with the Flash Smelting (1.04), Coal Coking (1.11), Electric Arc Processing (1.12), and High Temperature Coal Hopper (1.14) a plurality of metals can be extracted with a lower environmental footprint than conventional operations.

In a further embodiment of the present invention, municipal water treatment and solid waste management are integrated with district heating and electricity generation. Utilizing the Core and Recommended subsystems of FIG. 1, Fertilizer Production (1.17) could be further integrated to ensure valuable nutrients are recycled. Fischer-Tropsch processing within the Gas Cleanup and Processing (1.10) subsystem can further be used to provide automotive fuels.

In a final embodiment of the present invention, all of the Core, Recommended, and Optional subsystems of FIG. 1 are utilized in a large scale combined cycle poly-generation plant providing electricity, heating, cooling, and fresh water to a large metropolitan area. Capitalizing on economies of scale, such a superstructure could operate on advantageous feed-in tariffs for the disposal of a variety of wastes over a wide geographical area. It would further be capable of integrating distributed generation into its regional power grid through a plurality of operational modes, operating high energy demand subsystems during off-peak hours while lowering chemical output and instead utilizing that chemical energy during periods of high demand.

INDUSTRIAL APPLICABILITY

The present invention finds industrial applicability in the clean energy industry. In particular, the present invention relates to industrial applicability in the petrochemical and metallurgy industries. More particularly, the present invention finds industrial applicability in the pollution management and environmental footprint context of a wide range of industrial processing methods.

SCOPE OF THE INVENTION

Having illustrated and described the principles of the system and method of the present invention in various embodiments, it should be apparent to those skilled in the art that the embodiment can be modified in arrangement and detail without departing from such principles. For example, the carbonaceous feedstock may be entirely consumed on site if preferred. Therefore, the illustrated embodiments should be considered only as example of the invention and not as a limitation on its scope. Although the description above contains much specificity, these should not be construed as limiting the scope of the invention but as merely providing illustrations of some of the presently preferred embodiments of this invention. Further, it is appreciated that the scope of the present invention encompasses other embodiments which may become obvious to those skilled in the art, and that the scope of the present invention is accordingly to be limited by nothing other than the appended claims, in which reference to an element in the singular is not intended to mean one and only one unless explicitly so stated, but rather one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims.

The invention claimed is:

1. An electrolytic process comprising, in a single cell: electrolytically assisting a molten salt carbochlorination through simultaneously:
reacting a multi-phase residue of molten or semi-molten salts, metals and metal compounds with a carbon compound and a chlorinating agent, either of which may be a solid, liquid, gas or some combination thereof to provide a reacted residue and remaining multi-phase residue of molten or semi-molten salts, metals, and metal compounds; and
processing the remaining multi-phase residue and reacted residue with an electrochemical process utilizing one or more electrodes formed by molten lead and/or lead compounds which fluxes the multi-phase residue as well as selectively extracting elements into the molten electrodes.

2. The process of claim 1, wherein the multi-phase residue functions as a catalyst or heat carrier.

3. The process of claim 1, wherein the multi-phase residue comprises a lead alloy and further comprising routing at least some portion of the lead alloy to an oxidizing vessel.

4. The process of claim 1, wherein the carbochlorination produces an inert mineral residue comprising silica and further comprises transferring the sensible heat of the residue in a hot solids recycle process before being discharged.

5. The process of claim 1, further comprising extracting one or more metals from the multi-phase residue by further downstream processing.

6. The process of claim 1, wherein some portion of the multi-phase residue undergoes electrolysis in which metal chlorides and dissolved oxides can be removed individually or as a plurality of electrodeposited metals.

7. The process of claim 1, wherein the multi-phase residue concentrates chlorinated rare earth elements and radionuclides which are separated from the multi-phase residue.

8. The process of claim 1, wherein the carbochlorination process is fluxed by a molten lead compound comprising of lead(ii) chloride.

9. The process of claim 1, wherein the electrochemical process removes oxygen from the multi-phase residue.

10. The process of claim 1, wherein the electrochemical process is performed using plasma processing.

* * * * *